United States Patent [19]

Bottaro et al.

[11] Patent Number: 5,198,204
[45] Date of Patent: Mar. 30, 1993

[54] METHOD OF FORMING DINITRAMIDE SALTS

[75] Inventors: Jeffrey C. Bottaro, Mountain View; Robert J. Schmitt, Redwood City; Paul E. Penwell, Menlo Park; David S. Ross, Palo Alto, all of Calif.

[73] Assignee: SRI International, Menlo Park, Calif.

[21] Appl. No.: 539,647

[22] Filed: Jun. 18, 1990

[51] Int. Cl.$^5$ .................... C01B 21/20; C07C 241/00; C07C 243/00

[52] U.S. Cl. ............................ 423/385; 423/387; 423/400; 564/109

[58] Field of Search ............ 423/385, 387, 400; 564/109

[56] References Cited

U.S. PATENT DOCUMENTS

| | | | |
|---|---|---|---|
| 2,067,748 | 1/1937 | Zimmermann | 423/385 |
| 2,484,481 | 10/1949 | Arthur | 564/109 |
| 2,856,429 | 10/1958 | Sauer | 564/109 |
| 3,428,667 | 2/1969 | Hamel | 260/467 |
| 3,989,801 | 11/1976 | Field et al. | 423/385 |
| 4,216,191 | 8/1980 | Klemann et al. | 423/385 |
| 4,878,968 | 11/1989 | Willer et al. | 149/45 |

FOREIGN PATENT DOCUMENTS

| | | | |
|---|---|---|---|
| 7687 | 4/1969 | Japan | 564/109 |
| 438365 | 11/1935 | United Kingdom | 423/385 |
| 541461 | 11/1941 | United Kingdom | 423/385 |
| 997826 | 7/1965 | United Kingdom | 564/109 |

OTHER PUBLICATIONS

Leroy, George, et al., "A Theoretical Investigation of the Structure and Reactivity of Nitrogen-Centred Radicals", *Journal of Molecular Structure (Theochem)*, 153 (1987), p. 249 and Table 6.
"Third Quarterly Report: Basic Research in Solid Oxygen Oxidizers (u)", Report 0754-81Q-3, Dec., 1963, pp. 6-7.

Primary Examiner—Wayne A. Langel
Attorney, Agent, or Firm—John P. Taylor; Richard P. Lange

[57] ABSTRACT

A method is disclosed for forming a N,N-dinitramide salt having the formula $MN(NO_2)_2$ where M is a cation selected form the class consisting of a metal ion and a nitrogen-containing ion, which comprises contacting a carbamate with a nitrating agent to form an acidic dinitramide intermediate reaction product, and neutralizing the acidic dinitramide with a compound selected from the class consisting of ammonia ($NH_3$), hydrazine ($N_2H_4$), a primary amine having the formula $RNH_2$, a secondary amine having the formula $RR'NH$, and a salt having the formula AX; where R and R' are the same or different 1-6 carbon alkyls, A is a metal ion or a nitrogen-containing ion, and X is an anion selected from the class consisting of fluoride, chloride, hydroxyl, carbonate, alkoxide, and carboxyl anion, to form the corresponding dinitramide salt.

22 Claims, 1 Drawing Sheet

---

CONTACTING A CARBAMATE SUCH AS AMMONIUM CARABAMATE WITH A NITRATING AGENT SUCH AS NITRONIUM TETRAFLUOROBORATE TO FORM AN ACIDIC DINITRAMIDE INTERMEDIATE REACTION PRODUCT

NEUTRALIZING THE ACIDIC DINITRAMIDE WITH AMMONIA, A PRIMARY AMINE, HYDRAZINE, A SECONDARY AMINE, OR A SALT HAVING THE FORMULA AX WHERE A IS A METAL CATION OR A NITROGEN-CONTAINING CATION AND X IS A CHLORIDE, FLUORIDE, HYDROXYL, CARBONATE, ALKOXIDE, OR CARBOXYL ANION

CONTACTING A CARBAMATE SUCH AS AMMONIUM CARABAMATE WITH A NITRATING AGENT SUCH AS NITRONIUM TETRAFLUOROBORATE TO FORM AN ACIDIC DINITRAMIDE INTERMEDIATE REACTION PRODUCT

NEUTRALIZING THE ACIDIC DINITRAMIDE WITH AMMONIA, A PRIMARY AMINE, HYDRAZINE, A SECONDARY AMINE, OR A SALT HAVING THE FORMULA AX WHERE A IS A METAL CATION OR A NITROGEN-CONTAINING CATION AND X IS A CHLORIDE, FLUORIDE, HYDROXYL, CARBONATE, ALKOXIDE, OR CARBOXYL ANION

METHOD OF FORMING DINITRAMIDE SALTS

BACKGROUND OF THE INVENTION

1. Field of the Invention

This invention relates to a method of making dinitramide salts. More particularly, this invention relates to a method of making dinitramide salts by nitration of a carbamate.

2. Description of the Related Art

Solid oxidizers, such as ammonium perchlorate or potassium perchlorate, have been used in the past in rocket propellant formulation because of their greater stability than liquid oxidizers. However, the presence of a halogen in the solid oxidant produces a smoke trail which is observable on radar and sometimes visually as well. Also, chlorine poses a serious atmospheric environmental hazard of ozone depletion.

Because of such shortcomings in the use of perchlorate solid fuel oxidizers, other materials, including nitrate ($NO_3^-$) compounds, have been investigated in the search for oxidizers which would provide the desired energy density and stability, without the drawbacks of the perchlorate oxidants.

Hamel et al. U.S. Pat. No. 3,428,667 describes the reaction of an ionic nitronium salt with a primary organic nitramine to form N,N-dinitramines having the general formula $R-N(NO_2)_n$ where n is 1-2 and R is a monovalent or divalent organic radical. These compounds are said to be highly energetic and useful as ingredients in propellant, explosive, and pyrotechnic compositions.

Willer et al. U.S. Pat. No. 4,878,968 describes the formation of gun and rocket propellants which include substituted cubanes such as cubane-1,4-bis(ammonium nitrate), or 1,4-bis(ammonium)pentacyclo[$4.2.0.0^{2.5}.0^{3.8}.0^{4.7}$]octane dinitrate; and cubane ammonium nitrate, or pentacyclo-[$4.2.0.0^{2.5}.0^{3.8}.0^{4.7}$]-octylammonium nitrate.

Leroy et al., in "A Theoretical Investigation of the Structure and Reactivity of Nitrogen-Centered Radicals", published in the Journal of Molecular Structure (Theochem), 153 (1987) on pages 249-267, by Elsevier Science Publishers B.V. Amsterdam, The Netherlands, discusses the structure, stability, and reactivity of nitrogen-centered radicals. Listed in Table 6 are various reactions of N-centered radicals, including reactions of $N(NO_2)_2$ with $NH_2$ to form $2NHNO_2$, and with $CH_3NHNO_2$ to form $CH_3NNO_2$ and $NH(NO_2)$.

In the Third Quarterly Report on Basic Research in Solid Oxygen Oxidizers of Government Contract AF 04(611)-8549 dated December 1963, on pages 6 and 7, the reaction of nitronium tetrafluoroborate with the dianion of methylenedinitramine to form an intermediate anion is hypothesized, and it is speculated that the intermediate anion may either react with a second equivalent of nitronium tetrafluoroborate to form N,N,N',N'-tetranitromethylenediamine or undergo fragmentation to form an anion which has the formula $N(NO_2)_2$.

It would, however, be desirable to provide a safe, simple, and inexpensive method of forming a stable solid ionic nitrate compound useful as a rocket propellant fuel which would have the clear advantage over perchlorates of being free of chlorine, but would be as stable as presently used perchlorate compounds and be much more stable and inexpensive than prior art dinitramine compounds.

SUMMARY OF THE INVENTION

It is, therefore, an object of this invention to provide an improved method of forming dinitramide salts having the formula $MN(NO_2)_2$ where M is selected from the class consisting of a metal cation and a nitrogen-containing cation.

It is another object of this invention to provide an improved method of forming dinitramide salts having the formula $MN(NO_2)_2$, where M is selected from the class consisting of a metal cation and a nitrogen-containing cation, which comprises: nitrating a carbamate to form a dinitramide acid intermediate reaction product; and then neutralizing the intermediate reaction product with a compound selected from the class consisting of ammonia, hydrazine, a primary amine, a secondary amine, and a salt having the formula AX where A is a metal ion or a nitrogen-containing ion and X is a fluoride, chloride, hydroxyl, carbonate, alkoxide, or carboxyl anion.

It is yet another object of this invention to provide an improved method of forming dinitramide salts having the formula $MN(NO_2)_2$, where M is selected from the class consisting of a metal cation and a nitrogen-containing cation, comprising the steps of: nitrating a carbamate selected from the class consisting of ammonium carbamate, 1-4 carbon di, tri, and tetra alkyl ammonium carbamates, and alkali metal carbamates, to form a dinitramide acid intermediate product having the formula $HN(NO_2)_2$; and neutralizing the acid intermediate product with a compound selected from the class consisting of ammonia ($NH_3$), hydrazine ($N_2H_4$), a primary amine having the formula $RNH_2$, a secondary amine having the formula $RR'H$, and a salt having the formula AX; where R and R' are the same or different 1-6 carbon alkyls, A is a metal ion or a nitrogen-containing ion, and X is a fluoride, chloride, hydroxyl, carbonate, alkoxide, or carboxyl anion.

It is a further object of this invention to provide an improved method of forming dinitramide salts having the formula $MN(NO_2)_2$, where M is selected from the class consisting of a metal cation and a nitrogen-containing cation, comprising the steps of: nitrating a solution of ammonium carbamate dissolved in acetonitrile to form a dinitramide acid intermediate product having the formula $HN(NO_2)_2$; and neutralizing the acid intermediate product with a compound selected from the class consisting of ammonia ($NH_3$), hydrazine ($N_2H_4$), a primary amine having the formula $RNH_2$, a secondary amine having the formula $RR'NH$, and a salt having the formula AX; where R and R' are the same or different 1-6 carbon alkyls, A is a metal ion or a nitrogen-containing ion, and X is a fluoride, chloride, hydroxyl, carbonate, alkoxide, or carboxyl anion.

These and other objects of the invention will be apparent from the following description and accompanying flowsheet.

BRIEF DESCRIPTION OF THE DRAWINGS

The sole drawing is a flowsheet illustrating one embodiment of the process of the invention.

DETAILED DESCRIPTION OF THE INVENTION

The invention comprises a novel method for making dinitramide salts having the formula $M^+ \ ^-N(NO_2)_2$ which comprise stable high density, meltable, pumpable oxidizers useful as propellants in solid rocket engines, and stop-start liquid rocket engines.

In our copending U.S. patent application Ser. No. 07/540,020, entitled "DI-Nitramide SALTS AND METHOD OF MAKING SAME", filed on Jun. 18, 1990 and assigned to the assignee of this invention, cross-reference to which is hereby made, we described and claimed such novel dinitramide salts having the formula $M^+ \ ^-N(NO_2)_2$, where the $M^+$ cation may be a mono, di, or trivalent metal cation, or a nitrogen-containing cation, such as a 1-8 nitrogen-containing cation having the formula $(R_kH_mN_n)^{+z}$, wherein n=1 to 8, z=1 to n, k=0 to n+2+z, m=n+2+z−k, and each R is the same or different 1–6 carbon alkyl.

In accordance with the method of the present invention, the dinitramide salts claimed in said copending patent application are formed by a two step process which comprises first nitrating a carbamate to form the intermediate dinitramide acid having the formula $HN(NO_2)_2$; and then neutralizing the acid to form the dinitramide salt.

The carbamate used in the first step comprises ammonium carbamate having the formula $NH_2CO_2^-\ ^+NH_4$, a 1–4 carbon di, or tetra alkyl ammonium carbamate, or an alkali metal carbamate. In the preferred embodiment, the carbamate comprises ammonium carbamate. Examples of other carbamates which may be used instead of ammonium carbamate include, for example, trimethyl ammonium carbamate, tetramethyl ammonium carbamate, triethyl ammonium carbamate, lithium carbamate, sodium carbamate, and potassium carbamate.

The nitrating agent used in the initial reaction step to form the dinitramic acid intermediate product may comprise nitronium tetrafluoroborate, $(NO_2^+)_2(S_2O_7^{-2})$, $NO_2^+AlCl_4^-$, $N_2O_5$, $NO_2F$, $NO_2\ ^+PF_6^-$, $NO_2^+AsF_6^+$, $NO_2^+SbF_6^+$, acetylnitrate, trifluoroacetylnitrate, trifluoroacetylnitrate in combination with catalytic $BF_3$, acetonecyanohydrin nitrate in combination with catalytic $BF_3$, and any one of these in combination with nitric acid. In the preferred embodiment, nitronium tetrafluoroborate is used as the nitrating agent.

The initial reactants are dissolved (and suspended when not fully soluble) in an organic solvent such as acetonitrile, sulfolane, chloroform, ethyl acetate, nitromethane, ether, dichloromethane, and combinations thereof. In a preferred embodiment, acetonitrile is used as the solvent.

In a preferred embodiment of the method of the invention, the reaction is carried out in the absence of $NO^+$, NO, and $NO_2$, i.e. the reactants contain less than 5 wt. % total of any or all of the above oxides of nitrogen. Therefore, in accordance with a preferred embodiment of the invention, the reagents used in this reaction, i.e., the carbamate, the nitrating agent, and the solvent in which the carabamate is dissolved, should be made or purified to provide a content of $NO^+$, NO, and/or $NO_2$ in each reagent to less than 5 wt. %. For example, the specification may be met for the nitrating agent by using 99.9 wt. % or greater nitric acid in its preparation.

The first step of the reaction is carried out at ambient pressure within a temperature range of from −30° C. to about 20° C., preferably within a range of from 0° C. to about 5° C. The pH of the reaction mass is maintained, during the first reaction step, within the range of from about 0 to about 2. The first step is carried out for a period of from about ½ hour to about 1 day, depending upon the reaction temperature, the reactivity of the starting materials, and the desired yield. Preferably, the reaction is carried out over a period of from about ½ hour to about 1 hour.

A typical reaction for the first step of the process of the invention to form the intermediate dinitramide acid is shown in the following equation:

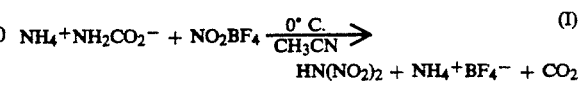

$$NH_4^+NH_2CO_2^- + NO_2BF_4 \xrightarrow[CH_3CN]{0°\ C.} HN(NO_2)_2 + NH_4^+BF_4^- + CO_2 \quad (I)$$

In the second step of the process, the acidic dinitramide intermediate reaction product may be neutralized with a compound selected from the class consisting of ammonia, hydrazine, a primary amine having the formula $RNH_2$, a secondary amine having the formula $RR'NH$, or a salt having the formula AX; wherein R and R' are the same or different 1–6 carbon alkyls, A is a mono, di, or trivalent metal cation or nitrogen-containing cation, and X is a a a fluoride, chloride, hydroxyl, carbonate, alkoxide, or carboxyl anion. If hydrazine is used as the neutralizing agent, extreme care should be exercised when handling the resultant product due to its possible shock sensitivity.

Metal ions which may comprise $A^+$ in the above equation include metal ions which form soluble salts with fluoride, chloride, hydroxyl, carbonate, alkoxide, or carboxyl anions. Typical metals which may comprise M include alkali metals Li, Na, K, Rb, and Cs; alkaline earth metals Ca, Ba, Sr, and Mg; Group Ib metals Cu, Ag, and Au; Group IIb metals Zn, Cd, and Hg; Group III metals Al, Sc, Y, Ga, In, and the Lanthanide elements (57-71); Group IV metals Ti, Zr, Hf, Ge, and Sn; Group V metals V, Nb, and Ta; Group VI metals Cr, Mo, and W; Group VIIa metals Mn, Tc, and Re; and Group VIII metals Fe, Co, Ni, Ru, Rh, Pd, Os, Ir, and Pt.

Of the foregoing metal ions which may comprise $A^+$, Li, Na, K, Be, and Mg are preferred metal ions used when a salt is used in the neutralizing step of the invention to form the dinitramide salts.

When the $A^+$ ion is a 1–8 nitrogen-containing cation, it may have the formula $(R''_kH_mN_n)^{+z}$, wherein n=1 to 8, k=0 to 2+n, z=1 to n, m=3+n−k, and each R'' is the same or different 1–6 carbon straight chain or branched alkyl. Examples of such ions include $NH_4^+$, $CH_3NH_3^+$, $(CH_3)_2NH_2^+$, $(CH_3)_3NH^+$, $(CH_3)_4N^+$, $C_2H_5NH_4^+$, $(C_2H_5)_2NH_2^+$, $(C_2H_5)_3NH^+$, $(C_2H_5)_3NH^+$, $(C_2H_5)(CH_3)NH_2^+$, $(C_2H_5)(CH_3)_2NH^+$, $(C_2H_5)_2(CH_3)_2N^+$, $(C_3H_7)_4N^+$, $(C_4H_9)_4N^+$, $N_2H_5^+$, $CH_3N_2H_4^+$, $(CH_3)_2N_2H_3^+$, $(CH_3)_3N_2H_2^+$, $(CH_3)_4N_2H^+$, $(CH_3)_5N_2^+$, etc.

The $A^+$ ion may also comprise a cubane-1,4-bis ammonium ion, such as described in the aforementioned Willer et al. U.S. Pat. No. 4,878,968, crossreference to which is hereby made.

Other nitrogen-containing cations which may comprise $M^+$ a cubane-1,2,4,7-tetra ammonium ion; a cubane-1,3,5,7-tetra ammonium ion; a cubane-1,2,3,-4,-tetra ammonium ion; a cubane-1,2,3,4,7-penta ammonium ion; or a cubane-1,2,4,6,8-penta ammonium ion; guanidium $(C(NH_2)_3^+)$; triaminoguanidinium $(C(N_2H_3)_3^+)$; nitronium $(O=N=O^+)$; nitrosonium $(N≡O^+)$; a 1–10,000 nitrogen polymer of ethyleneimine.

The neutralization reaction of the $HN(NO_2)_2$ acid intermediate reaction product with ammonia, hydrazine, a primary amine, a secondary amine, or the AX salt conveniently may be carried out in the same solvent used for the initial nitration of the carbamate, e.g., in acetonitrile.

The neutralization step may be carried out at a temperature ranging from $-40°$ C. to $150°$ C., preferably from about $0°$ C. to about $20°$ C. The neutralization may be carried out at ambient pressure for a time period which may range from as short as 1 minute to as long as one week, depending upon the reactivity of the starting materials, the temperature selected, and the desired yield. Usually the reaction will be carried out for a period of from about 1 to about 2 hours.

When ammonia gas is used as the neutralizing agent, ammonia gas at a temperature of from about $0°$ C. to about $20°$ C. may be bubbled through the reaction mass in, for example, a 1 liter reactor, at a rate of from about 100 standard cubic centimeters/minute )sccm) to about 1000 sccm for a period of from about 1 minute to $\frac{1}{2}$ hour to form the desired dinitramide salt.

When a primary amine, a secondary amine, or the AX salt is used as the neutralizing agent, the liquid (or solid) may be stirred into the reaction mass for a similar period of time to form the desired dinitramide salt.

The respective neutralizations of the acidic intermediate reaction product may be represented by the following equations:

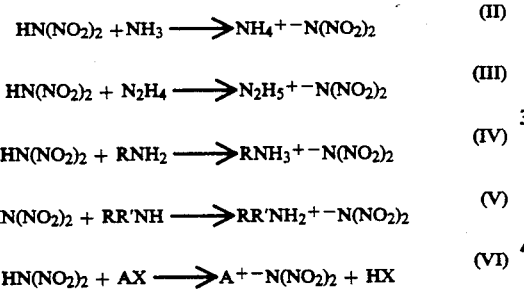

It will be recognized from the above reaction equations II-VI that M, in the previously discussed dinitramide salt formula $MN(NO_2)_2$, may comprise not only those cations which comprise A, in the above discussed AX salt, but may also comprise $NH_4^+$, when $NH_3$ gas is used as the neutralizing agent, $N_2H_5^+$, when $N_2H_4$ is used as the neutralizing agent, $RNH_3^+$ when a primary amine is used as the neutralizing agent, and $RR'NH_2^+$ when a secondary amine is used as the neutralizing agent.

The following examples will serve to further illustrate the invention.

EXAMPLE I

To a $-20°$ C. suspension of 3 grams of nitronium tetrafluoroborate in 25 ml of acetonitrile was added 0.8 grams of ammonium carbamate. The rate of addition was controlled as appropriate to control the temperature. The reaction was stirred for 60 minutes at $-20°$ C. to form the dinitramide acid intermediate reaction product.

A solution of 50 ml of 3 molar $NH_3$ in isopropanol was mixed with 200 ml of ethyl ether and stirred vigorously. The reaction mixture was then poured into this stirred solution. The resulting mixture was then stirred for 5 minutes. The mixture was evaporated to dryness, triturated with 10 ml of 1:1 acetone/ethyl acetate, filtered, evaporated to dryness, and 150 milligrams of ammonium dinitramide was crystallized from 2 ml of butanol, a 15% yield.

EXAMPLE II

To a $-20°$ C. suspension of 3 grams of nitronium tetrafluoroborate in 25 ml of acetonitrile was added 0.8 grams of ammonium carbamate. The rate of addition was controlled as appropriate to control the temperature. The reaction was stirred for 60 minutes at $-20°$ C. to form the dinitramide acid intermediate reaction product.

A solution of 50 ml of aqueous 3 molar potassium carbonate was mixed with 200 ml of ethyl ether and stirred vigorously. The reaction mixture was then poured into this stirred solution. The resulting mixture was then stirred for 5 minutes. The mixture was evaporated to dryness, triturated with 10 ml of 1:1 acetone/ethyl acetate, filtered, evaporated to dryness, and 150 milligrams of potassium dinitramide was crystallized from 2 ml of butanol, a 15% yield.

The same results may be obtained by neutralizing the acidic intermediate dinitramide reaction product of the example with monomethylamine, dimethylamine, ammonium fluoride, tetramethylammonium fluoride, tetrabutylammonium fluoride, and cesium fluoride.

Similar results may be obtained when 1-4 carbon di, tri, or tetra alkyl ammonium carbamate, or an alkali metal carbamate are used instead of ammonium carbamate in the above example; and when $(NO_2^+)_2(S_2O_7^{-2})$, $NO_2^+AlCl_4^-$, $N_2O_5$, $NO_2F$, $NO_2^+PF_6^-$, $NO_2^+AsF_6^-$, $NO_2^+SbF_6^-$, acetylnitrate, trifluoroacetylnitrate, trifluoroacetylnitrate in combination with catalytic $BF_3$, acetonecyanohydrin nitrate in combination with catalytic $BF_3$, or any one of these in combination with nitric acid is used as the nitrating agent, in the above example.

Thus, the invention provides a novel method of making dinitramide salts useful as oxidizers in rocket fuels and which exhibit high temperature stability, high energy density, and an absence of smoke generating halogens, by nitration of a carbamate followed by neutralization of the resulting acidic intermediate dinitramide reaction product.

Having thus described the invention what is claimed is:

1. A method of making a N,N-dinitramide salt having the formula $MN(NO_2)_2$ where M is a cation selected from the class consisting of a metal ion and a nitrogen-containing ion which comprises:
   a) contacting a carbamate with a nitrating agent to form an acidic dinitramide intermediate reaction product having the formula $HN(NO_2)_2$; and
   b) neutralizing the acidic dinitramide intermediate reaction product by contacting it with a compound selected from the class consisting of ammonia $(NH_3)$, hydrazine $(N_2H_4)$, a primary amine having the formula $RNH_2$, a secondary amine having the formula $RR'NH$, and a salt having the formula AX; where R and R' are the same or different 1-6 carbon alkyls, A is a metal ion or a nitrogen-containing ion, and X is an anion selected from the class consisting of a fluoride, chloride, hydroxyl, carbonate, alkoxide, and carboxyl.

2. The method of claim 1 wherein said step of contacting a carbamate with a nitrating agent further comprises contacting with a nitrating agent a carbamate selected from the class consisting of ammonium carbamate having the formula $NH_4^+CO_2NH_2^-$, a 1–4 carbon di, tri, or tetra alkyl ammonium carbamate, and an alkali metal carbamate.

3. The method of claim 2 wherein said carbamate is selected from the class consisting of ammonium carbamate, trimethyl ammonium carbamate, tetramethyl ammonium carbamate, triethyl ammonium carbamate, lithium carbamate, sodium carbamate, and potassium carbamate.

4. The method of claim 2 wherein said step of contacting a carbamate with a nitrating agent further comprises contacting ammonium carbamate with a nitrating agent.

5. The method of claim 2 wherein said step of contacting a carbamate with a nitrating agent further comprises contacting said carbamate with a nitrating agent selected from the class consisting of nitronium tetrafluoroborate, $(NO_2^+)_2(S_2O_7^{-2})$, $NO_2^+AlCl_4^-$, $N_2O_3$, $NO_2F$, $NO_2^+PF_6^-$, $NO_2^+AsF_6^-$, $NO_2^+SbF_6^-$, acetylnitrate, trifluoroacetylnitrate, trifluoroacetylnitrate in combination with catalytic $BF_3$, acetonecyanohydrin nitrate in combination with catalytic $BG_3$, and any one of said nitrating agents in combination with nitric acid.

6. The method of claim 2 wherein said step of contacting a carbamate with a nitrating agent further comprises contacting said carbamate with nitronium tetrafluoroborate.

7. The method of claim 2 wherein said carbamate is contacted with a mixture of said nitrating agent and a solvent.

8. The method of claim 7 wherein said solvent is selected from the class consisting of acetonitrile, sulfolane, chloroform, ethyl acetate, nitromethane, ether, dichloromethane, and combinations thereof.

9. The method of claim 2 wherein said carbamate is contacted with a mixture of said nitrating agent and acetonitrile to form said intermediate reaction product having the formula $HN(NO_2)_2$.

10. The method of claim 9 wherein said carbamate is contacted with a mixture of nitronium tetrafluoroborate and acetonitrile to form said intermediate reaction product having the formula $HN(NO_2)_2$.

11. The method of claim 9 wherein ammonium carbamate is contacted with a mixture of nitronium tetrafluoroborate and acetonitrile to form said intermediate reaction product having the formula $HN(NO_2)_2$.

12. The method of claim 1 wherein said step of neutralizing said intermediate reaction product comprises contacting it with a salt having the formula AX where A is a mono, di, or trivalent metal cation selected from the class consisting of Li, Na, K, Rb, Cs, Ca, Ba, Sr, Mg, Cu, Ag, and Au, Zn, Cd, Hg, Al, Sc, Y, Ga, In, Lanthanide elements (57–71), Ti, Zr, Hf, Ge, Sn, V, Nb, Ta, Cr, Mo, W, Mn, Tc, Re, Fe, Co, Ni, Ru, Rh, Pd, Os, Ir, and Pt.

13. A method of making a N,N-dinitramide salt having the formula $MN(NO_2)_2$ where M is a cation selected from the class consisting of a metal ion and a nitrogen-containing ion which comprises:

a) contacting a carbamate selected from the class consisting of ammonium carbamate having the formula $NH_4^+CO_2NH_2^-$, a 1–4 carbon di, tri, or tetra alkyl ammonium carbamate, and an alkali metal carbamate with a nitrating agent selected from the class consisting of nitronium tetrafluoroborate, $(NO_2^+)_2(S_2O_7^{-2})$, $NO_2^+$, $N_2O_5$, $AlCl_4^-$, $NO_2F$, $NO_2^+PF_6^-$, $NO_2^+AsF_6^-$, $NO_2^+SbF_6^-$, acetylnitrate, trifluoroacetylnitrate, trifluoroacetylnitrate in combination with catalytic $BF_3$, acetonecyanohydrin nitrate in combination with catalytic $BF_3$, and any of said nitrating agents in combination with nitric acid to form an acidic dinitramide intermediate reaction product having the formula $HN(NO_2)_2$; and b) neutralizing the acidic dinitramide intermediate reaction product by contacting it with a compound selected from the class consisting of ammonia ($NH_3$), hydrazine ($N_2H_4$), a primary amine having the formula $RNH_2$, a secondary amine having the formula RR'NH, and a salt having the formula AX; where R and R' are the same or different 1–6 carbon alkyls, A is a metal ion or a nitrogen-containing ion, and X is an anion selected from the class consisting of fluoride, chloride, hydroxyl, carbonate, alkoxide, and carboxyl.

14. The method of claim 13 wherein said step of neutralizing said intermediate reaction product comprises contacting it with a salt having the formula AX where A is a mono, di, or trivalent metal cation selected from the class consisting of Li, Na, K, Rb, Cs, Ca, Ba, Sr, Mg, Cu, Ag, and Au, Zn, Cd, Hg, Al, Sc, Y, Ga, In, Lanthanide elements (57–71), Ti, Zr, Hf, Ge, Sn, V, Nb, Ta, Cr, Mo, W, Mn, Tc, Re, Fe, Co, Ni, Ru, Rh, Pd, Os, Ir, and Pt.

15. The method of claim 14 wherein A is a metal cation selected from the class consisting of Li, Na, K, Be, and Mg.

16. The method of claim 13 wherein A is a 1–8 nitrogen-containing cation having the formula $(R''_kH_mN_n)^{+z}$, wherein n = 1 to 8, k = 0 to 2+n, Z = 1 to n, m = 2+n+z−k, and each R'' is the same or different 1–6 carbon straight chain or branched alkyl.

17. The method of claim 13 wherein A is a nitrogen-containing cation selected from the class consisting of cubane-1,4-bis ammonium ion; cubane-1,2,4,7-tetra ammonium ion; cubane-1,3,5,7-tetra ammonium ion; cubane-1,2,3,4-tetraammonium ion; cubane-1,2,3,4,7-penta ammonium ion; cubane-1,2,4,6,8-penta ammonium ion; guanidium ($C(NH_2)_3^+$); triaminoguanidinium ($C(N_2H_3)_3^+$); nitronium ($O=N=O^+$); nitrosonium ($N=O^+$); and a 1–10,000 nitrogen polymer of ethyleneimine.

18. A method of making a N,N-dinitramide salt having the formula $MN(NO_2)_2$ where M is a cation selected from the class consisting of a metal ion and a nitrogen-containing ion which comprises:

a) contacting ammonium carbamate with a nitronium tetrafluoroborate nitrating agent in acetonitrile to form an acidic dinitramide intermediate reaction product having the formula $HN(NO_2)_2$; and b) neutralizing the acidic dinitramide intermediate reaction product by contacting it with ammonia ($NH_3$) to form ammonium dinitramide having the formula $NH_4^+N(NO_2)_2^-$.

19. The method of claim 18 wherein said ammonium carbamate/nitronium tetrafluoroborate/acetonitrile solution is maintained within a temperature range of from about −30° c to about 20° C. during said nitrating step.

20. The method of claim 18 wherein said nitrating step is carried out for a period of from about ¼ hour to about 1 day.

21. The method of claim 18 wherein said neutralizing step is carried out at a temperature of from about −40° C. to about 150° C. at ambient pressure for a time period ranging from about 1 minute to about 168 hours.

22. The method of claim 18 wherein said neutralizing step is carried out at a temperature of from about 0° C. to about 20° C. at ambient pressure for a time period ranging from about 1 hour to about 2 hours.

* * * * *

UNITED STATES PATENT AND TRADEMARK OFFICE
CERTIFICATE OF CORRECTION

PATENT NO.   :   5,198,204
DATED        :   March 30, 1993
INVENTOR(S)  :   Jeffrey C. Bottaro, Robert J. Schmitt, Paul E. Penwell
                 David S. Ross It is certified that error appears in the above-indentified patent and that said Letters Patent is hereby corrected as shown below:

At Column 1, Line 3, before BACKGROUND OF THE INVENTION, insert the following:

"This invention was made with Government support under Contracts N00014-88-C-0537, N00014-92-C-0102, and N00014-92-C-0181 awarded by the Department of the Navy. The Government has certain rights in the invention."

Signed and Sealed this

Thirteenth Day of June, 1995

*Attest:*

*Attesting Officer*

BRUCE LEHMAN

*Commissioner of Patents and Trademarks*